United States Patent [19]

Leistner

[11] Patent Number: 4,508,478
[45] Date of Patent: Apr. 2, 1985

[54] TEE NUT FASTENER MEMBER

[75] Inventor: Herbert E. Leistner, Toronto, Canada

[73] Assignee: Sigma Tool & Machine Limited, Scarborough, Canada

[21] Appl. No.: 512,620

[22] Filed: Jul. 11, 1983

[51] Int. Cl.³ .............................................. F16B 39/00
[52] U.S. Cl. ...................................... 411/176; 411/427
[58] Field of Search ............... 411/179, 176, 177, 180, 411/181, 183, 442, 443, 444, 427; 206/338, 340, 343, 345

[56] References Cited

U.S. PATENT DOCUMENTS

| 3,140,010 | 7/1964 | Double | 411/427 X |
| 3,227,270 | 1/1966 | Floyd | 206/340 |
| 3,460,217 | 8/1969 | Leistner | 408/70 X |
| 3,480,061 | 11/1969 | Leistner | 411/177 |
| 3,845,860 | 11/1974 | Ladouceur | 411/179 X |

*Primary Examiner*—Gary L. Smith
*Assistant Examiner*—Adrian H. Whitcomb, Jr.

[57] ABSTRACT

A fastener member having a base flange, a central perpendicular sleeve with internal threads for reception of a threaded fastening, fastening teeth struckout of such base flange for reception in a wooden work piece, the base flange having a forward feed edge and a rearward feed edge, and side feed edges, and abutment means in the base flange adjacent the feed edges and spaced apart from the fastening teeth, adapted to inter-engage with one another to prevent such feed edges from overriding one another in a feed track.

4 Claims, 5 Drawing Figures

U.S. Patent    Apr. 2, 1985    4,508,478
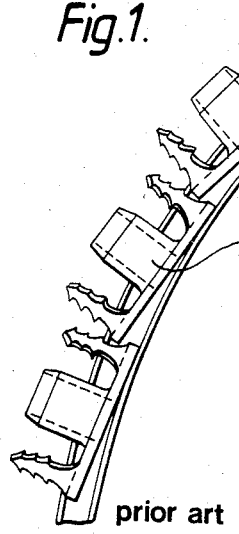
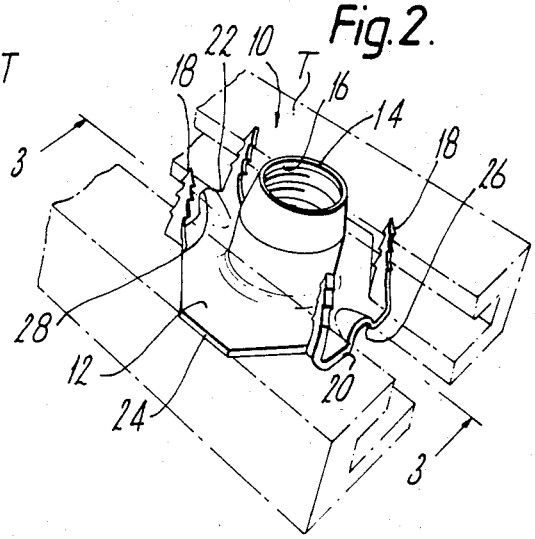
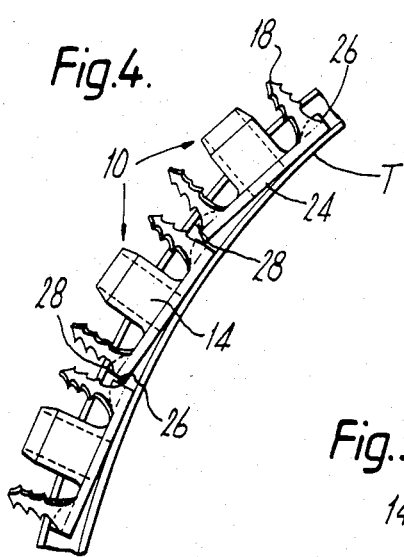
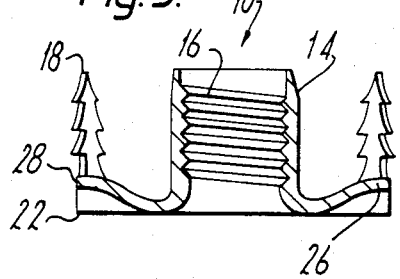
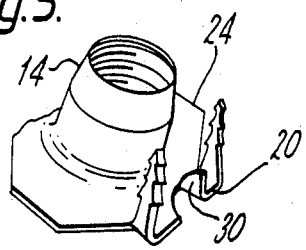

TEE NUT FASTENER MEMBER

The invention relates to a fastener member of the type used in furniture for securing furniture components together. In particular, the invention relates to a fastener member, having a tubular shank portion and a flange portion and commonly known as a tee-nut.

BACKGROUND OF THE INVENTION

Fastener members, having a tubular shank portion and a flange portion, are known and are commonly referred to as tee-nuts. In this specification, the term "tee-nut" is used to describe such fastener members. In particular, the tee-nuts, substantially as shown in U.S. Pat. No. 3,480,061, are widely used in automatic setting machines, in the furniture industry.

Such tee-nuts are formed of sheet metal, and provide a flanged portion, and a threaded sleeve, and a plurality of fastening teeth, all formed out of a single portion of sheet metal.

Typically, such tee-nuts are used, for example, in bed frames, for fastening the legs of the bed to the frame. They do have a variety of other uses, both in furniture, and in many other industries.

The industry provides automatic setting machines, as shown in U.S. Pat. No. 3,460,217. Typically, the machine will incorporate a power drill, for drilling a hole in a wooden work piece, after which the drill is automatically removed, and a tee-nut is automatically supplied to the wooden work piece, and is then forced into it, with the sleeve of the tee-nut in the pre-drilled hole. The teeth on the flange of the tee-nut are embedded in the wood around the hole and thus secure it in position.

It is of course essential that such automatic setting machines shall be supplied with a continuous and reliable feed mechanism, for feeding the tee-nuts to the work piece. Any tendency for the feed mechanism to jam will result in downtime on the setting machine, with the resultant loss in production.

The feed mechanism for supplying such tee-nuts to the work piece involves a hopper, and a track in which the tee-nuts are fed in line from the hopper to the work piece.

Usually, the tee-nuts are fed into the track in one orientation, and the track then is curved through one hundred and eighty degrees, so as to bring the tee-nut to the work piece in the reverse orientation. The track thus functions essentially to upset or reverse the tee-nut.

In so doing, it is necessary for the track to be curved around an arc usually of about one hundred and eighty degrees.

When travelling in the track, the tee-nuts have a tendency to override one another as they move around the curved portion of the track, and this has been a frequent cause of misfeeding and jamming of the feed mechanism.

One solution to this problem would be simply to reduce the clearance in the track so that the tee-nut flanges could not tilt relative to one another. However, while this might be the ideal solution, it has not been found to be practicable. The track is usually manufactured out of a piece of straight bar stock, by milling a pair of grooves in the bar, which grooves receive opposite sides of the flange. The bar is then carefully bent into the appropriate shape.

It is therefore necessary to leave a relatively great degree of clearance in the track, so as to allow for the bending of the track.

BRIEF SUMMARY OF THE INVENTION

With a view to overcoming the foregoing problems, the invention therefore comprises a fastener member for use in an automatic fastener member setting machine having a feed track, such fastener member comprising a base flange, an integrally formed central sleeve perpendicular to such base flange, and having internal threads formed therein for reception of threaded fastening means, and having a plurality of fastening teeth extending generally normally from said base flange for reception in a wooden work piece, said base flange defining a forward feed edge and a rearward feed edge, and side feed edges, such side feed edges being adapted to be received in opposite sides of a feed track, with such forward feed edge of one such fastener member in engagement with the rearward feed edge of the next adjacent fastener member in such track, and, abutment means formed in said base flange adjacent said forward feed edge and spaced apart from said fastening teeth, and further abutment means formed in such base flange adjacent such rear edge and spaced apart from said fastening teeth, such abutment means in one of said forward and rear feed edges being adapted to interengage with the abutment means or the feed edge of the other of such forward and rear feed edges of the next adjacent fastener members in such track, whereby to prevent such feed edges from overriding one another.

More particularly, the invention seeks to provide a fastener member having such features and advantages, wherein the abutment means are formed by deforming such base flange, such deformation having a height greater than the thickness of the base flange.

The various features of novelty which characterize the invention are pointed out with particularity in the claims annexed to and forming apart of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a sectional illustration of the feed track of a typical automatic tee-nut fastening machine, showing the tee-nuts riding in such track, with some of such tee-nuts overriding others, and causing jamming;

FIG. 2 is an illustration of a tee-nut according to the invention incorporating the feed edge abutment means showing the feed track in phantom;

FIG. 3 is a section along the line 3—3 of FIG. 2;

FIG. 4 is a sectional illustration of a feed track showing the tee-nuts according to the invention feeding in the correct, non-jamming relationship, and, FIG. 5 is a perspective illustration showing an alternate embodiment of the invention.

DESCRIPTION OF A SPECIFIC EMBODIMENT

As shown in FIG. 1, the tee-nut setting machine is indicated generally as S, having a track, T, for feeding the tee-nuts, which are indicated generally as N.

Such drawing is labelled prior art to indicate the overriding and jamming problems encountered with typical setting machines and prior art tee-nuts.

It will be observed that as the tee-nuts pass around curved portions of the track, there is a tendency for the flanges to override one another, causing the nuts to jam in the track.

Referring now to FIGS. 2 and 3, the invention will be seen to comprise a tee-nut which is indicated generally as 10, having a base flange, 12, and an integral fastening sleeve, 14, extending perpendicularly therefrom. The sleeve, 14, has internal thread, 16, for the reception of a threaded member. Typically, such threaded member will be another portion of furniture such as the leg of a bed or table.

In such cases, the tee-nuts, 10, will be embedded in the wood, typically the wooden frame, on the bed, with the fastening sleeve 14 inserted in a pre-drilled hole.

These features are not illustrated herein since they are well known in the art and require no further description.

In order to secure the tee-nut in the wooden work piece, a plurality, usually four, fastening teeth 18 are formed integrally from the base flange, 12, by striking out elongated portions. Usually such teeth, 18, are provided with serrations or teeth to give them a better hold in the wood.

Again, these features are well known in the art and require no further description.

Usually, for the sake of simplicity, such base flanges are made with forward and rearward edges, 20 and 22, which are designated here as the forward and rear feed edges.

Side edges 24 of the flange ride in grooves in the track.

It will of course be appreciated that since the track was considerably oversized in relation to the thickness of the sheet metal of the base flange, that the forward feed edge 20 of one such tee-nut could, in the past, over-ride the rearward feed edge 22 of the next adjacent tee-nut and so on.

In accordance with the invention, this problem is now overcome by the incorporation of a forward feed abutment, 26, in the forward feed edge, 20, and a further rearward edge feed abutment, 28, in the rearward feed edge, 22.

As is apparent from FIGS. 2 and 3, such feed abutments are formed by indenting the sheet metal to a significant depth relative to the thickness of the base flange.

Since the forward feed abutment 26 of one tee-nut will always be in contact either with the rearward edge 22 or the rearward feed abutment 28 of the next adjacent tee-nut, it is impossible for the edges of the tee-nuts to override one another and cause jamming in the track.

The end result of the invention is illustrated generally in FIG. 4, showing the nature of this engagement in a typical situation.

It will of course be appreciated that while the formation of such abutments is best provided in the manner shown in FIGS. 2 and 3, that is to say by indenting the sheet metal of the base flange itself, it is also possible to provide such abutments in other ways. For example, it would be possible to simply provide one or more lanced out pieces, 30, as shown in FIG. 5.

While the invention is illustrated as applied to tee-nuts of sheet metal, the invention is not confined solely to such a construction.

Tee-nuts may be made of other materials, either cast metal, or non-metals such as plastics.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A fastener member for use in an automatic fastener member setting machine having a feed track, such fastener member comprising;

a base flange;

an integrally formed central sleeve perpendicular to such base flange, and having internal threads formed therein for reception of threaded fastening means;

a plurality of fastening teeth and extending generally normally from said base flange for reception in a wooden work piece, said base flange defining a forward feed edge and a rearward feed edge, and side feed edges, such side feed edges being adapted to be received in opposite sides of a feed track, with such forward feed edge of one such fastener member in engagement with the rearward feed edge of the next adjacent fastener member in such track, and, abutment means formed in said base flange adjacent said forward feed edge and spaced apart from said fastening teeth, and further abutment means formed in such base flange adjacent such rear edge and spaced apart from said fastening teeth, such abutment means in one of said forward and rear feed edges being adapted to inter-engage with the abutment means or the feed edge of the other of such forward and rear feed edges of the next adjacent fastener members in such track, whereby to prevent such feed edges from overriding one another.

2. A fastener member as claimed in claim 1, wherein the abutment means are formed by deforming such base flange, such deformation having a height greater than the thickness of the base flange.

3. A fastener member as claimed in claim 1 wherein such abutment means are formed by lancing out portions of such base flange, perpendicular thereto.

4. A fastener member as claimed in claim 1 wherein the material of the base flange comprises generally flattened sheet metal and wherein the fastening teeth are formed by struck out portions of the base flange.

* * * * *